US010417062B2

(12) United States Patent
Yuan et al.

(10) Patent No.: US 10,417,062 B2
(45) Date of Patent: Sep. 17, 2019

(54) METHOD AND APPARATUS OF UNLOADING OUT OF MEMORY PROCESSING FLOW TO USER SPACE

(71) Applicant: BEIJING BAIDU NETCOM SCIENCE AND TECHNOLOGY CO., LTD., Beijing (CN)

(72) Inventors: Linsi Yuan, Beijing (CN); Baisheng Wang, Beijing (CN); Dong Sun, Beijing (CN); Zhiyong Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 71 days.

(21) Appl. No.: 15/280,122

(22) Filed: Sep. 29, 2016

(65) Prior Publication Data

US 2017/0329655 A1    Nov. 16, 2017

(30) Foreign Application Priority Data

May 13, 2016  (CN) .......................... 2016 1 0320045

(51) Int. Cl.
G06F 9/54       (2006.01)
G06F 9/48       (2006.01)
G06F 3/06       (2006.01)

(52) U.S. Cl.
CPC ............ *G06F 9/542* (2013.01); *G06F 3/0613* (2013.01); *G06F 3/0647* (2013.01);
(Continued)

(58) Field of Classification Search
CPC ...... G06F 9/542; G06F 3/0613; G06F 3/0647; G06F 3/0659; G06F 3/0683; G06F 9/485; G06F 9/545
(Continued)

(56) References Cited

U.S. PATENT DOCUMENTS

2014/0143791 A1*  5/2014  Mark .................... G06F 9/485
                                                          719/318
2016/0371194 A1* 12/2016  Wagle .................. G06F 9/5016

FOREIGN PATENT DOCUMENTS

CN         1896957 A       1/2007

OTHER PUBLICATIONS

David Rientjes; User-space out-of-memory handling; Mar. 19, 2014; 8 pages (Year: 2014).*
(Continued)

*Primary Examiner* — S. Sough
*Assistant Examiner* — Kimberly L Jordan
(74) *Attorney, Agent, or Firm* — Seed IP Law Group LLP (57) ABSTRACT

The present application discloses a method and apparatus of unloading an out of memory (OOM) processing flow to a user space. A specific implementation of the method includes: writing related information of an OOM event into a memory page shared by a user space and a kernel space when a process triggers the OOM event, the related information comprising: an identification of the process and a path of a memory resource control sub-system where the process exists; acquiring, by an OOM service process of the user space, the related information of the OOM event through the memory page; and processing, by the OOM service process of the user space, the OOM event using the related information of the OOM event. The implementation implements unloading of an OOM processing in a kernel state to a user state for execution, and the whole OOM processing process is handed over to a user state process for implementation, which reduces the complexity of execution of the OOM processing, and is conducive to adjustment of OOM processing strategies and upgrade and replacement of services.

11 Claims, 5 Drawing Sheets (52) U.S. Cl.
CPC .......... *G06F 3/0659* (2013.01); *G06F 3/0683* (2013.01); *G06F 9/485* (2013.01); *G06F 9/545* (2013.01)

(58) Field of Classification Search
USPC ........................................................ 719/318
See application file for complete search history.

(56) References Cited

OTHER PUBLICATIONS

Jonathan Corbet; Toward reliable user-space OOM handling; Jun. 5, 2013; 9 pages (Year: 2013).*
Memory Management in Linux—Desktop Companion to the Linux Source Code; ; Abhishek Nayani, Mel Gorman, and Rodrigo S. de Castro; 393 pages; May 2002 (Year: 2002).*

* cited by examiner

METHOD AND APPARATUS OF UNLOADING OUT OF MEMORY PROCESSING FLOW TO USER SPACE

CROSS-REFERENCE TO RELATED APPLICATION

This application claims the priority of Chinese Patent Application No. 201610320045.6, entitled "Method and Apparatus of Unloading Out of Memory Processing Flow to User Space," filed on May 13, 2016, the content of which is incorporated herein by reference in its entirety.

TECHNICAL FIELD

The present application relates to the field of computer technology, specifically to the field of computer operating system technology, and more specifically, to a method and apparatus of unloading an out of memory (OOM) processing flow to a user space.

BACKGROUND

In the event that a computer is under high load pressure, and to increase resource utilization of the computer, exhaustion of the physical memory in the computer often occurs, leading to frequent triggering of the out of memory (OOM) process. The OOM process in the kernel becomes the last defense to reduce the pressure on the system memory. Execution of the OOM process in a standard kernel becomes complicated due to the diverse application scenarios. The execution process in a kernel state under the high load pressure seems to be overly redundant and lengthy. Moreover, a prolonged kernel state processing in an operating system tends to cause system deadlock, resulting in problems such as system outage, thereby reducing service stability and availability.

On the other hand, as the application scenarios vary, more demands are raised for OOM processing strategies on the service layer. After the memory is overrun, new strategies to selectively end processes are proposed, such as preferentially ending low-priority operations. Changes of these strategies may make OOM processing logic more complex, and the OOM processing process becomes more time-consuming. Moreover, implementation of these strategies in the kernel also results in some difficulties in service upgrade and deployment.

SUMMARY

An objective of the present application is to provide a method and an apparatus of unloading an out of memory processing flow to a user space, so as to solve the technical problem mentioned in the foregoing Background section.

In a first aspect, the present application provides a method of unloading an out of memory (OOM) processing flow to a user space, the method including: writing related information of an OOM event into a memory page shared by a user space and a kernel space when a process triggers the OOM event, the related information comprising: an identification of the process and a path of a memory resource control sub-system where the process exists; acquiring, by an OOM service process of the user space, the related information of the OOM event through the memory page; and processing, by the OOM service process of the user space, the OOM event using the related information of the OOM event.

In some embodiments, the method further includes: switching the process triggering the OOM event from an operating state to a sleep state, and suspending the process triggering the OOM event to a waiting queue; and awakening the process triggering the OOM in the waiting queue after completing the processing of the OOM event, and reattempting to apply for memory.

In some embodiments, the method further includes: notifying the OOM service process of the user space after writing the related information of the OOM event into the memory page shared by the user space and the kernel space.

In some embodiments, the processing, by the OOM service process of the user space, the OOM event using the related information of the OOM event includes: scoring, by the OOM service process of the user space, terminatable processes based on memory occupation conditions; and sending, by the OOM service process of the user space, a process termination signal to the process having a highest score.

In some embodiments, the OOM service process of the user space does not respond to the process termination signal sent by the user space.

In some embodiments, the processing, by the OOM service process of the user space, the OOM event using the related information of the OOM event includes: sending, by the OOM service process of the user space, a notification of completion of the processing of the OOM event to the kernel space.

In some embodiments, the method further includes: monitoring the OOM service process of the user space, and spontaneously reporting an exit event before the OOM service process of the user space exits.

In a second aspect, the present application provides an apparatus of unloading an out of memory (OOM) processing flow to a user space, wherein the apparatus includes: an OOM kernel module, configured to write related information of an OOM event into a storage module shared by a user space and a kernel space when a process triggers the OOM event, the related information including: an identification of the process and a path of a memory resource control sub-system where the process exists; the storage module, configured to store the related information of the OOM event; an OOM service module, configured to acquire the related information of the OOM event through the storage module, and further configured to process the OOM event using the related information of the OOM event.

In some embodiments, the apparatus further includes: a process suspending module, configured to switch the process triggering the OOM event from an operating state to a sleep state, and suspend the process triggering the OOM event to a waiting queue; and awaken the process triggering the OOM in the waiting queue after completing the processing of the OOM event, and reattempt to apply for memory.

In some embodiments, the OOM kernel module is further configured to: notify the OOM service module after writing the related information of the OOM event into the storage module shared by the user space and the kernel space.

In some embodiments, the OOM service module is further configured to: score, by the OOM service process of the user space, terminatable processes that based on memory occupation conditions; and send, by the OOM service process of the user space, a process termination signal to the process having a highest score.

In some embodiments, the OOM service module is further configured not to respond to the process termination signal sent by the user space.

In some embodiments, the OOM service module is further configured to send a notification of completion of the processing of the OOM event to the OOM kernel module.

In some embodiments, the apparatus further includes: a monitoring module, configured to monitor the OOM service process of the user space, and spontaneously report an exit event to the OOM kernel module before the OOM service process of the user space exits.

According to the method and apparatus of unloading an OOM processing flow to a user space provided in the present application, related information of an OOM event is written through a kernel into a memory page shared by a kernel space and the user space, the user space performs OOM processing after reading the written related information of the OOM event, and unloads an OOM mechanism in a kernel state to a user state for execution. The whole OOM processing process is handed over to a user state process for implementation, which reduces the complexity of the OOM execution, and is conducive to adjustment of OOM strategies and upgrade and replacement of services.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
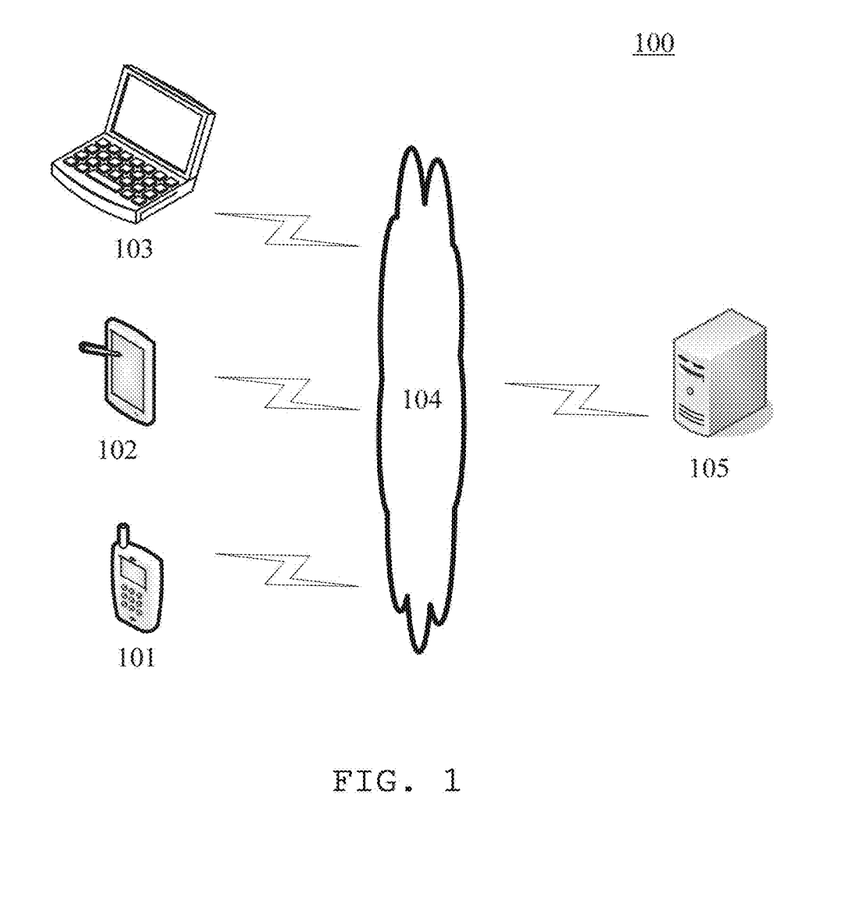
FIG. 1 is an architectural diagram of an exemplary system in which the present application may be implemented.

FIG. 1 shows an exemplary architecture of a system 100 which may be used by a method or apparatus of unloading an OOM processing flow to a user space according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as cloud storage applications, shopping applications, search applications, instant messaging tools, mailbox clients, social platform software, etc. may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server with an operating system, such as Window, Linux, etc.

It should be noted that the method of unloading an OOM processing flow to a user space according to the embodiments of the present application is generally executed by the server 105 or the terminal devices 101, 102 and 103, and accordingly, an apparatus of unloading an OOM processing flow to a user space is generally installed on the server 105 or the terminal devices 101, 102 and 103.

It should be appreciated that the numbers of the terminal devices, the networks and the servers in FIG. 1 are merely illustrative. Any number of terminal devices, networks and servers may be provided based on the actual requirements.

Figure 2:
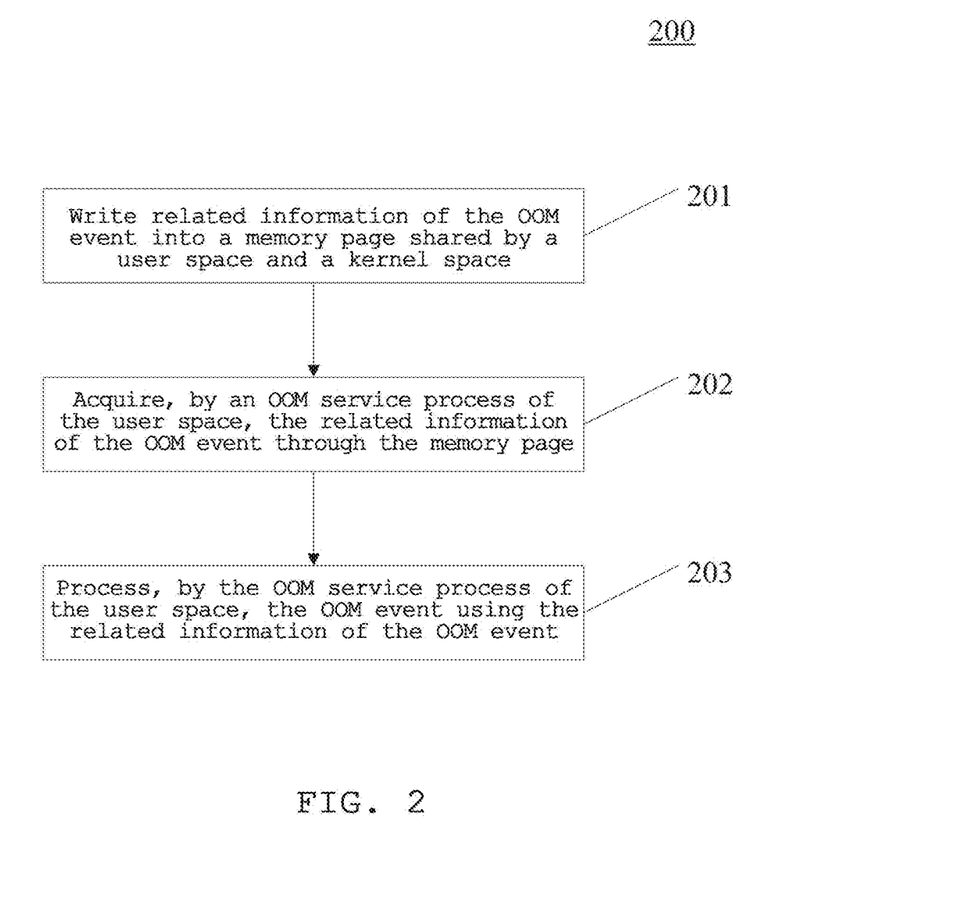
FIG. 2 is a flow chart of a method of unloading an OOM processing flow to a user space according to an embodiment of the present application.

Further referring to FIG. 2, a flow 200 of a method of unloading an out of memory (OOM) processing flow to a user space according to an embodiment of the present application is shown. The method of unloading an OOM processing flow to a user space includes the following steps:

Step 201: Write related information of the OOM event into a memory page shared by a user space and a kernel space.

In this embodiment, an electronic device (for example, a server or terminal shown in FIG. 1) on which the method of unloading the OOM processing flow to the user space runs may write the related information of the OOM event into the memory page (mmap) shared by the user space and the kernel space when OOM occurs in the kernel. The related information includes: the identification PID of the process triggering the OOM and the path of the memory resource control sub-system (memory cgroup) where the process triggering the OOM exists.

In some optional implementations of this embodiment, the OOM service process of the user space is notified after the related information of the OOM event is written into the memory page shared by the user space and the kernel space.

In some optional implementations of this embodiment, in case that the memory is tight, to ensure that the OOM service process of the user space may successfully apply for the memory to implement computation tasks, a TIF_MEMDIE flag is added to the OOM service process to ensure that the OOM service process may use the memory under a water line reserved by the system for the kernel, when the OOM service process is created.

In some optional implementations of this embodiment, when the OOM service process of the user space has problems, the OOM service will automatically enter an original standard OOM processing process of the kernel.

Step 202: Acquire, by an OOM service process of the user space, the related information of the OOM event through the memory page.

In this embodiment, after the kernel writes the related information of the OOM event into the memory page shared by the user space and the kernel space, the OOM service process of the user space reads the information.

In some optional implementations of this embodiment, the OOM service process of the user space receives the notification, sent by the kernel, of completion of writing of the related information of the OOM event, and then reads the information.

Step 203: Process, by the OOM service process of the user space, the OOM event using the related information of the OOM event.

In this embodiment, the OOM service process of the user space processes the OOM event using the related information of the OOM event, and ends some processes to release the memory space.

In some optional implementations of this embodiment, the OOM service process of the user space scores terminatable processes based on memory occupation conditions; and the OOM service process of the user space sends a process termination signal to the process having the highest score.

In some optional implementations of this embodiment, the OOM service process of the user space does not respond to the process termination signal sent by the user space. The OOM service process, as used for unloading the kernel functions, requires that the OOM service process always exists during operation of the system. Therefore, when the OOM service process is started, the kernel clears the signal processing of the process, and sets a SIGNAL_UNKILL-ABLE flag, so that the OOM service process no longer responds to the end signal sent by the user state, thereby avoiding that the OOM service process is killed artificially by mistake.

In some optional implementations of this embodiment, the OOM service process of the user space sends a notification of completion of the processing of the OOM event to the kernel space. After receiving the notification from the user space, the OOM kernel module awakens those tasks waiting for memory allocation.

In some optional implementations of this embodiment, the OOM service process of the user space is monitored, and an exit event is spontaneously reported before the OOM service process of the user space exits. For example, monitoring the OOM service process of the user space is implemented based on the kernel's utrace framework. When the OOM service process of the user space exits abnormally, the exit event of the process will be spontaneously reported to a monitoring module before the process exits. Therefore, the process in the OOM event which is being processed by the current OOM service process but not completed may be awakened, so that the process reattempts to apply for memory. If the application fails again, the process may be processed by the OOM mechanism in the standard kernel.

Figure 3:
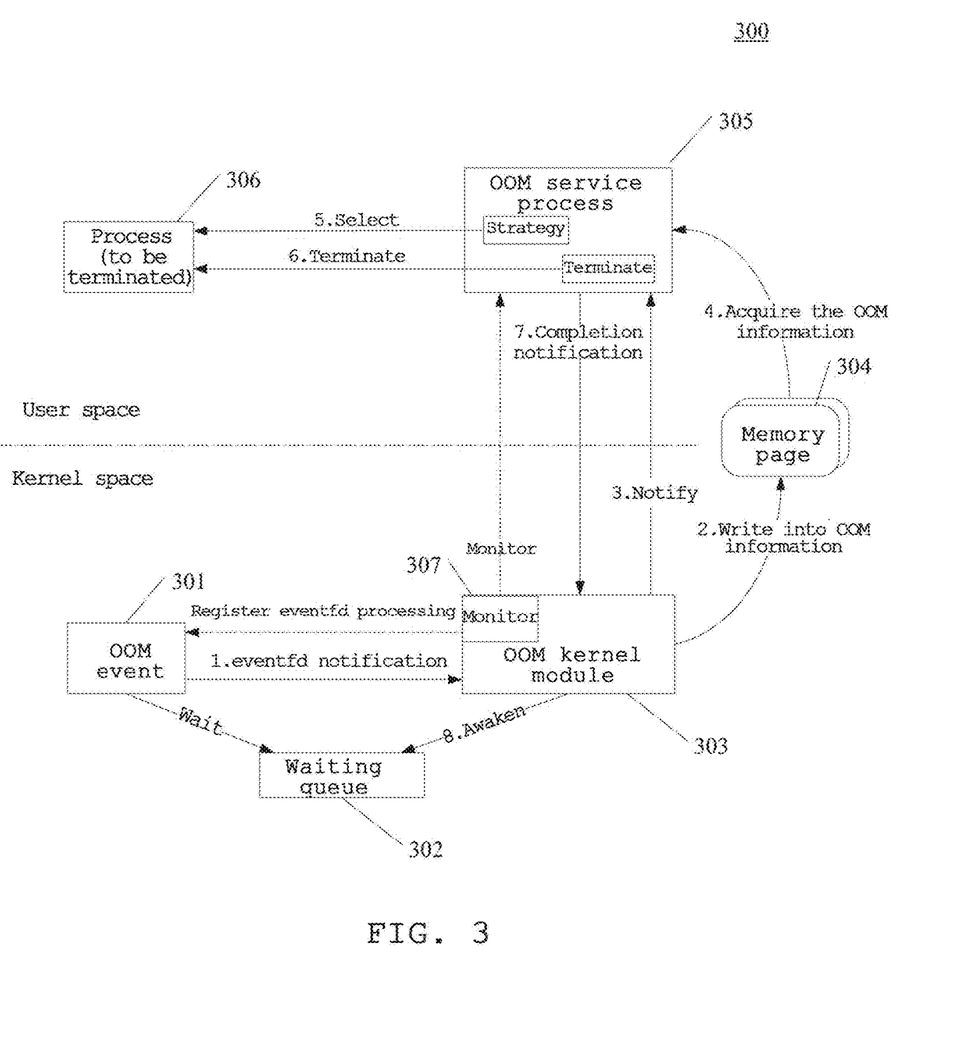
FIG. 3 is a schematic diagram of an application scenario of a method of unloading an OOM processing flow to a user space according to the present application.

Further referring to FIG. 3, a schematic diagram of an application scenario of a method of unloading an OOM processing flow to a user space according to this embodiment is shown. In the application scenario of FIG. 3, the processing flow of the event is shown as follows:

(1) When an OOM event 301 occurs, a code on a path for triggering the OOM event in the kernel (typical paths include: paths for applying for memory in a memory cgroup and in a system page fault exception handler) switches the process that triggers the OOM event from an operating state to a sleep state first, and spontaneously triggers scheduling, so that the process concedes the CPU, and is suspended to a waiting queue 302. Then, the OOM event is sent to an OOM kernel module 303 through eventfd.

(2) The OOM kernel module 303 may write related information of the OOM event, including the PID of the process triggering the OOM and the memory cgroup path where the process is located, into an mmap memory page 304 shared by the user state and the kernel state.

(3) An OOM service process 305 of the user space is awakened and notified by means of eventfd.

(4) The OOM service module 305 of the user space acquires the related information of the OOM event from the mmap memory page 304, including the PID of the process triggering the OOM and the memory cgroup path where the process is located.

(5) The OOM service process 305 traverses and scores processes 306, and selects a processe to be terminated based on a strategy.

(6) The OOM service process 305 sends a SIGKILL signal to the selected processe.

(7) The OOM service process 305 sends a notification of completion of the processing of the OOM event to the OOM kernel module 303; when the OOM service process 305 exits abnormally, the exit event of the process will be spontaneously reported to a monitoring module 307 before the process exits. Therefore, the process in the OOM event which is being processed by the current OOM service process 305 but not completed may be awakened, so that the process reattempts to apply for memory. If the application fails again, the process may be processed by the OOM mechanism in the standard kernel.

(8) The OOM kernel module 303 awakens the processes in the waiting queue 302 to reattempt to apply for memory.

The method provided in the above embodiment of the present application unloads the OOM processing flow to the user space, notifies the OOM kernel module by means of eventfd, instead of directly calling functions in the OOM kernel module, thereby achieving the aim of decoupling. The OOM kernel module may perform loading and unloading successfully during operation of the system. Therefore, the complexity of OOM processing logic is reduced, the time consumption of the OOM processing process is reduced, and the upgrade and deployment of services become easier.

Figure 4:
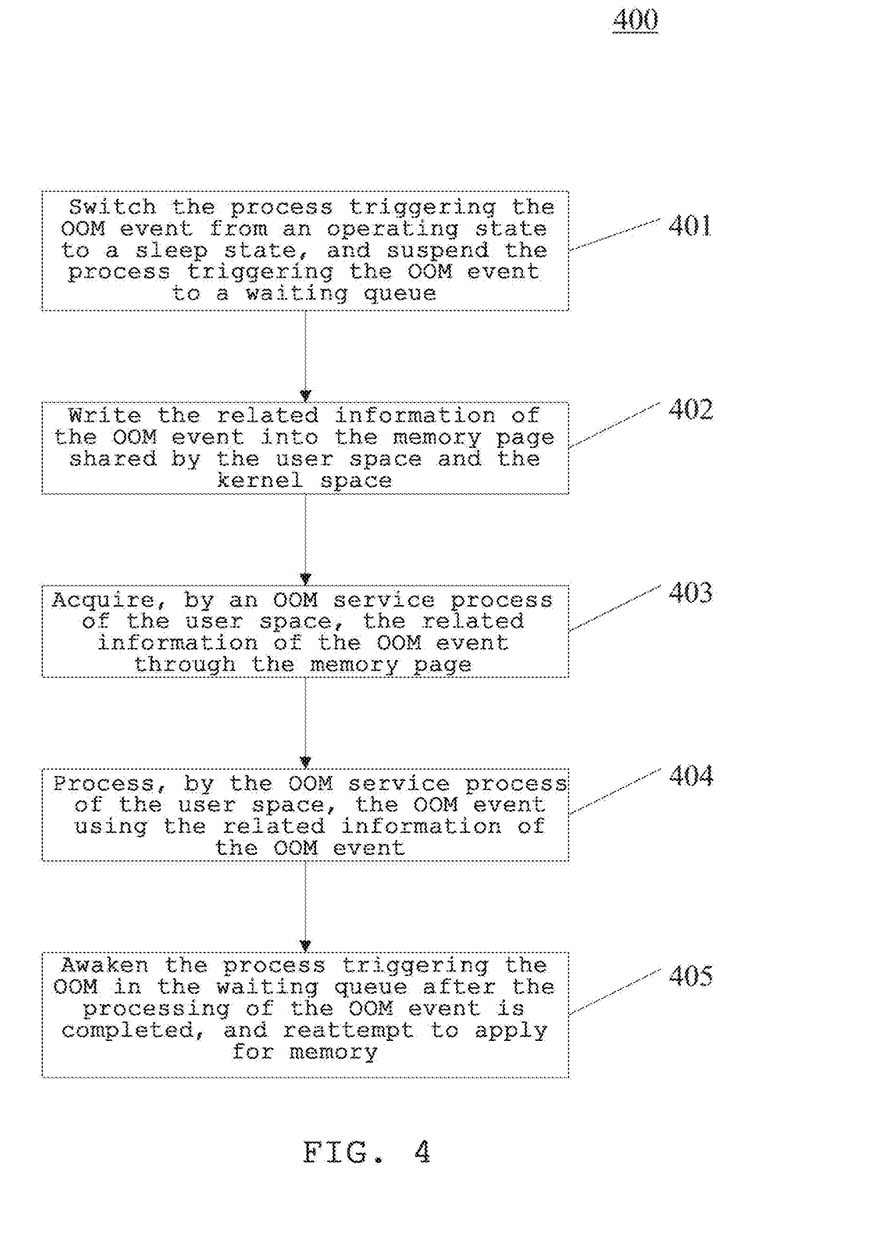
FIG. 4 is a flow chart of a method of unloading an OOM processing flow to a user space according to another embodiment of the present application.

Further referring to FIG. 4, a flow 400 of a method of unloading an OOM processing flow to a user space of another embodiment is shown. The flow 400 of the method of unloading the OOM processing flow to the user space includes the following steps:

Step 401: Switch the process triggering the OOM event from an operating state to a sleep state, and suspend the process triggering the OOM event to a waiting queue.

In this embodiment, for an electronic device (for example, a server or terminal shown in FIG. 1) on which the method of unloading the OOM processing flow to the user space runs, when an OMM event occurs, codes on the path for triggering the OOM event in the kernel switch the process triggering the OOM event from the operating state to the sleep state first, and suspend the process to the waiting queue.

In some optional implementations of this embodiment, when the memory resource control sub-system (memory cgroup) has been in an OOM state, creation of new processes in the memory cgroup group or migration of processes outside the group into the memory cgroup group may be suspended. When a new process is created for a process already in the group, after the new process is created, if the memory cgroup where the process is located is in the OOM state, a TIF_MEMCG_THROTTLE flag bit is set, and a signal is delivered to the process, so that the newly created process enters the signal processing process during the first operation after creation. During the signal processing process, the newly created process is switched to the sleep state, is suspended to the OOM event waiting queue in the corresponding memory group, and is removed from the memory cgroup group where the process is located. After OOM events in the memory cgroup where the process is located are processed, the processes in the OOM event waiting queue are awakened, and the processes are then added to a target memory cgroup again. Likewise, when an external process attempts to migrate into the memory cgroup, if the target memory cgroup is already in the OOM state, a signal is delivered to the newly entered process, and subsequent processing is the same as the processing of the newly created process.

Step 402: Write the related information of the OOM event into the memory page shared by the user space and the kernel space.

Step 403: Acquire, by an OOM service process of the user space, the related information of the OOM event through the memory page.

Step 404: Process, by the OOM service process of the user space, the OOM event using the related information of the OOM event.

The steps 402-404 are substantially identical to the steps 201-203, and are not repeated herein.

Step 405: Awaken the process triggering the OOM in the waiting queue after the processing of the OOM event is completed, and reattempt to apply for memory.

In this embodiment, the kernel awakens the process triggering the OOM in the waiting queue after receiving a notification of completion of the processing of the OOM event, and reattempts to apply for memory.

It can be seen from FIG. 4 that, compared with the embodiment corresponding to FIG. 2, the flow 400 of the method of unloading the OOM processing flow to the user space in this embodiment emphasizes the step of processing the memory cgroup already in the OOM state. For the memory cgroup already in the OOM state, creation of processes and migration of external processes to the current memory cgroup are suspended, thereby avoiding that a newly created process or a newly entered process further consumes the memory and thus causes a new round of OOM in the memory cgroup that has reached a memory usage upper limit. In an extreme case, frequent creation or new scheduling of processes may even cause an OOM storm, so that the system is in the OOM state for a long time and cannot provide normal services. On the other hand, the OOM processing process being executed may also reduce the number of processes to be processed, thereby improving the speed of the OOM processing.

Figure 5:
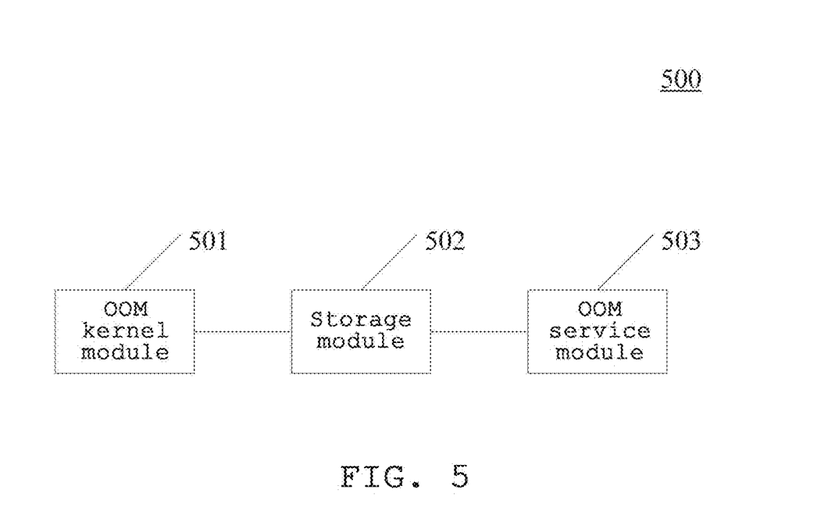
FIG. 5 is a schematic structural diagram of an apparatus of unloading an OOM processing flow to a user space according to an embodiment of the present application.

Further referring to FIG. 5, as an implementation of the methods shown in the above mentioned drawings, the present application provides an embodiment for an apparatus of unloading an OOM processing flow to a user space. The apparatus embodiment corresponds to the method embodiment shown in FIG. 2, and the apparatus may be specifically applied to various electronic devices.

As shown in FIG. 5, an apparatus 500 of unloading an OOM processing flow to a user space in this embodiment includes: an OOM kernel module 501, a storage module 502, and an OOM service module 503. The OOM kernel module 501 is configured to write related information of an OOM event into a storage module shared by a user space and a kernel space when a process triggers the OOM event. The related information including: the identification of the process and the path of the memory resource control sub-system where the process exists. The storage module 502 is configured to store the related information of the OOM event. The OOM service module 503 is configured to acquire the related information of the OOM through the storage module, and further configured to process the OOM event using the related information of the OOM event.

In this embodiment, the OOM kernel module 501 is located in the kernel space, the storage module 502 is shared by the user space and the kernel space, and the OOM service module 503 is located in the user space.

In some optional implementations of this embodiment, the apparatus 500 of unloading the OOM processing flow to the user space further includes: a process suspending module, configured to switch the process triggering the OOM event from an operating state to a sleep state, and suspend the process triggering the OOM event to a waiting queue; and awaken the process triggering the OOM in the waiting queue after the processing of the OOM event is completed, and reattempt to apply for memory.

In some optional implementations of this embodiment, the OOM kernel module 501 is further configured to: notify the OOM service module after the related information of the OOM event is written into the storage module shared by the user space and the kernel space.

In some optional implementations of this embodiment, the OOM service module 503 is further configured to: score, by the OOM service process of the user space, terminatable processes based on memory occupation conditions; and send, by the OOM service process of the user space, a process termination signal to the process having the highest score.

In some optional implementations of this embodiment, the OOM service module 503 is further configured not to respond to the process termination signal sent by the user space.

In some optional implementations of this embodiment, the OOM service module 503 is further configured to send, to the OOM kernel module, a notification of completion of the processing of the OOM event.

In some optional implementations of this embodiment, the apparatus 500 of unloading the OOM processing flow to the user space further includes: a monitoring module, configured to monitor the OOM service process of the user space, and spontaneously report an exit event to the OOM kernel module before the OOM service process of the user space exits.

Figure 6:
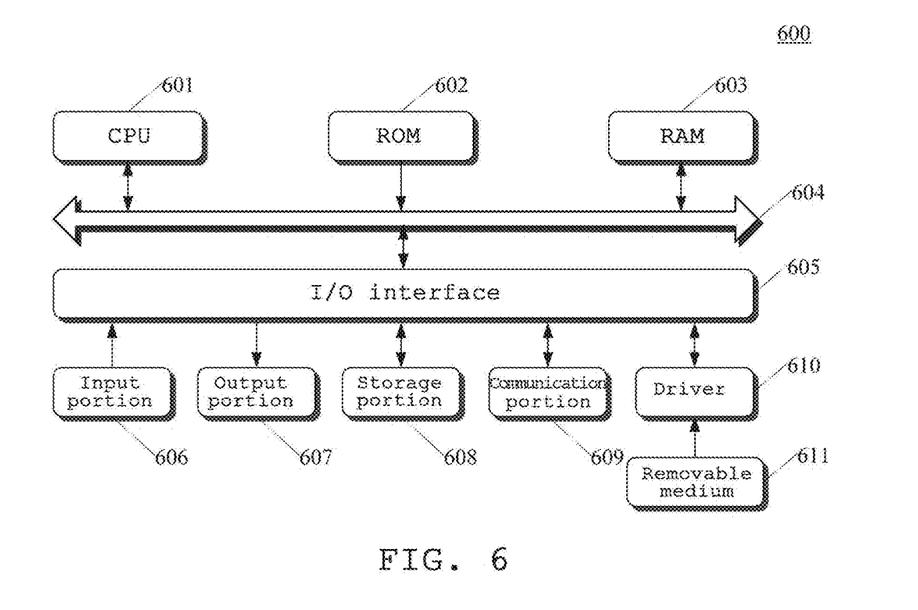
FIG. 6 is a schematic structural diagram of a computer system adapted to implement a terminal device or a server of the embodiments of the present application.

Referring to FIG. 6, a schematic structural diagram of a terminal device or computer system 600 adapted to implement the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an OOM kernel module, a storage module and an OOM service module, where the names of these units or modules are not considered as a limitation to the units or modules. For example, the storage module may also be described as "a module for storing the related information of the OOM event".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs, which when executed by a device, cause the device to: write related information of an OOM event into a memory page shared by a user space and a kernel space when a process triggers the OOM event, the related information comprising: an identification of the process and a path of a memory resource control sub-system where the process exists; acquire, by an OOM service process of the user space, the related information of the OOM event through the memory page; and process, by the OOM service process of the user space, the OOM event using the related information of the OOM event.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method of unloading an out of memory (OOM) processing flow to a user space, comprising:
    writing related information of an OOM event into a memory page shared by a user space and a kernel space when a process triggers the OOM event, the related information comprising: an identification of the process and a path of a memory resource control sub-system where the process exists;
    switching the process triggering the OOM event from an operating state to a sleep state, and suspending the process triggering the OOM event to a waiting queue;
    suspending creation of a new process in a group the OOM event occurs or migration of processes into the group;
    notifying an OOM service process of the user space;
    adding flags to the OOM service process of the user space to enable the OOM service process of the user space to use a memory under a water line reserved by a system for a kernel, and ensure that the OOM service process of the user space does not respond to a process termination signal sent by the user space;
    acquiring, by the OOM service process of the user space, the related information of the OOM event through the memory page; and
    processing, by the OOM service process of the user space, the OOM event using the related information of the OOM event.

2. The method according to claim 1, further comprising:
    awakening the process triggering the OOM in the waiting queue after completing the processing of the OOM event, and reattempting to apply for memory.

3. The method according to claim 1, wherein the processing, by the OOM service process of the user space, the OOM event using the related information of the OOM event comprises:
    scoring, by the OOM service process of the user space, terminatable processes based on memory occupation conditions; and
    sending, by the OOM service process of the user space, a second process termination signal to the process having a highest score.

4. The method according to claim 1, wherein the processing, by the OOM service process of the user space, the OOM event using the related information of the OOM event comprises:

sending, by the OOM service process of the user space, a notification of completion of the processing of the OOM event to the kernel space.

5. The method according to claim 1, further comprising:
monitoring the OOM service process of the user space, and spontaneously reporting an exit event before the OOM service process of the user space exits.

6. An apparatus of unloading an out of memory (OOM) processing flow to a user space, comprising:
at least one processor; and a memory storing instructions, the instructions when executed by the at least one processor, cause the at least one processor to perform operations, the operations comprising:
writing related information of an OOM event into a storage module shared by a user space and a kernel space when a process triggers the OOM event, the related information comprising: an identification of the process and a path of a memory resource control sub-system where the process exists;
switching the process triggering the OOM event from an operating state to a sleep state, and suspending the process triggering the OOM event to a waiting queue;
suspending creation of a new process in a group the OOM event occurs or migration of processes into the group;
notifying an OOM service process of the user space;
adding flags to the OOM service process of the user space to enable the OOM service process of the user space to use a memory under a water line reserved by a system for a kernel, and ensure that the OOM service process of the user space does not respond to a process termination signal sent by the user space;
acquiring the related information of the OOM event through the storage module; and
processing the OOM event using the related information of the OOM event.

7. The apparatus according to claim 6, wherein the operations further comprise:
awakening the process triggering the OOM in the waiting queue after completing the processing of the OOM event, and reattempt to apply for memory.

8. The apparatus according to claim 6, wherein the processing, by the OOM service process of the user space, the OOM event using the related information of the OOM event comprises:
scoring, by the OOM service process of the user space, terminatable processes that based on memory occupation conditions; and sending, by the OOM service process of the user space, a second process termination signal to the process having a highest score.

9. The apparatus according to claim 6, wherein the processing, by the OOM service process of the user space, the OOM event using the related information of the OOM event comprises:
sending, by the OOM service process of the user space, a notification of completion of the processing of the OOM event to the OOM kernel module.

10. The apparatus according to claim 6, further comprising:
monitoring the OOM service process of the user space, and spontaneously reporting an exit event to the OOM kernel module before the OOM service process of the user space exits.

11. A non-transitory storage medium storing one or more programs, the one or more programs when executed by an apparatus, causing the apparatus to perform a method of unloading an out of memory (OOM) processing flow to a user space, the method comprising:
writing related information of an OOM event into a memory page shared by a user space and a kernel space when a process triggers the OOM event, the related information comprising: an identification of the process and a path of a memory resource control sub-system where the process exists;
switching the process triggering the OOM event from an operating state to a sleep state, and suspending the process triggering the OOM event to a waiting queue;
suspending creation of a new process in a group the OOM event occurs or migration of processes into the group;
notifying an OOM service process of the user space;
adding flags to the OOM service process of the user space to enable the OOM service process of the user space to use a memory under a water line reserved by a system for a kernel, and ensure that the OOM service process of the user space does not respond to a process termination signal sent by the user space;
acquiring, by the OOM service process of the user space, the related information of the OOM event through the memory page; and
processing, by the OOM service process of the user space, the OOM event using the related information of the OOM event.

* * * * *